July 26, 1949.　　　E. J. GREENWOOD ET AL　　　2,477,515
ARRESTING GEAR
Filed Aug. 13, 1948　　　　　　　　　　　4 Sheets-Sheet 1
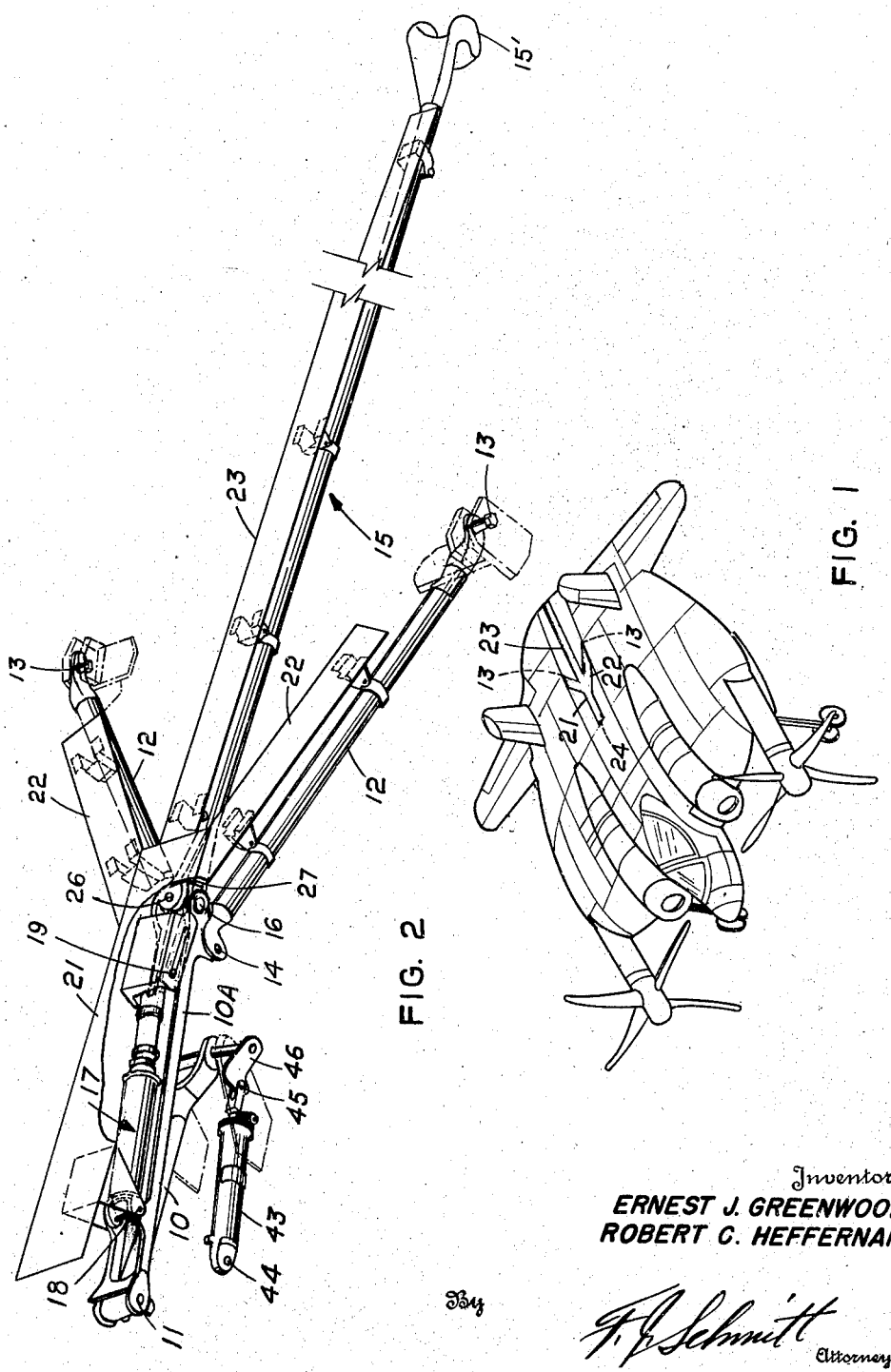
Inventors
ERNEST J. GREENWOOD
ROBERT C. HEFFERNAN
By F. J. Schmitt
Attorney July 26, 1949.　　　E. J. GREENWOOD ET AL　　　2,477,515
ARRESTING GEAR
Filed Aug. 13, 1948　　　　　　　　　　　　4 Sheets-Sheet 2
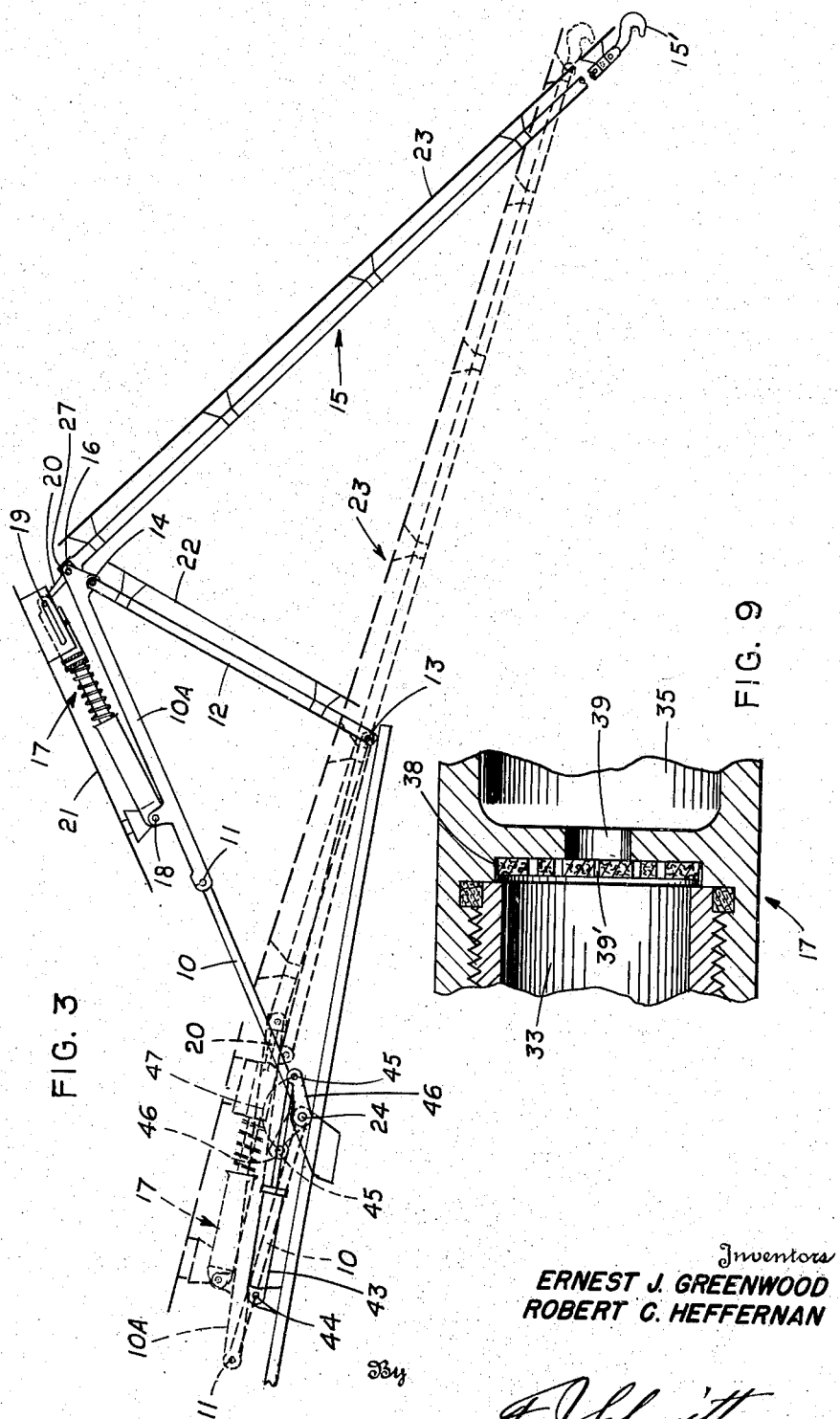
Inventors
ERNEST J. GREENWOOD
ROBERT C. HEFFERNAN July 26, 1949.  E. J. GREENWOOD ET AL  2,477,515
ARRESTING GEAR
Filed Aug. 13, 1948  4 Sheets-Sheet 3
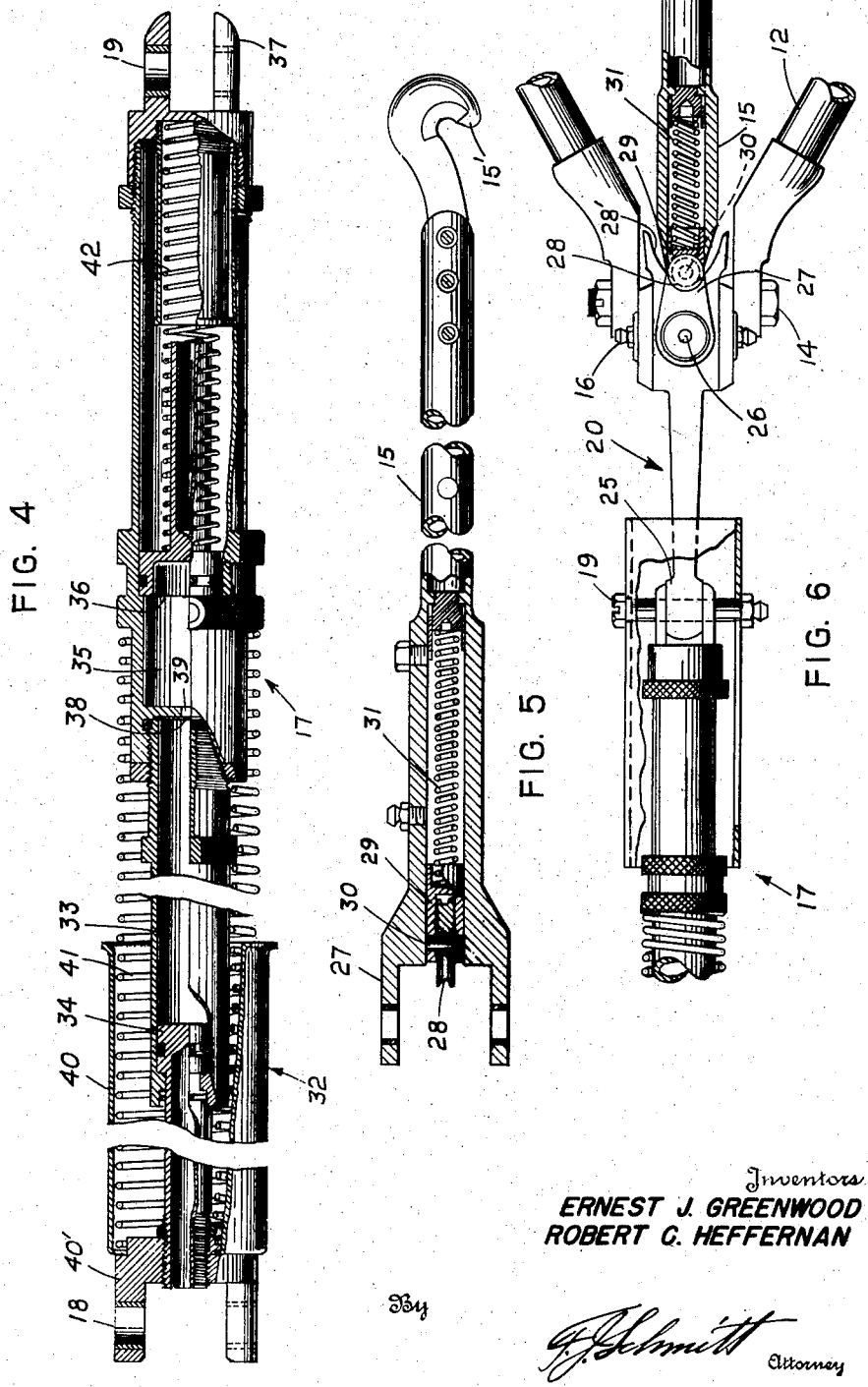
Inventors
ERNEST J. GREENWOOD
ROBERT C. HEFFERNAN
By
G. J. Schmitt
Attorney

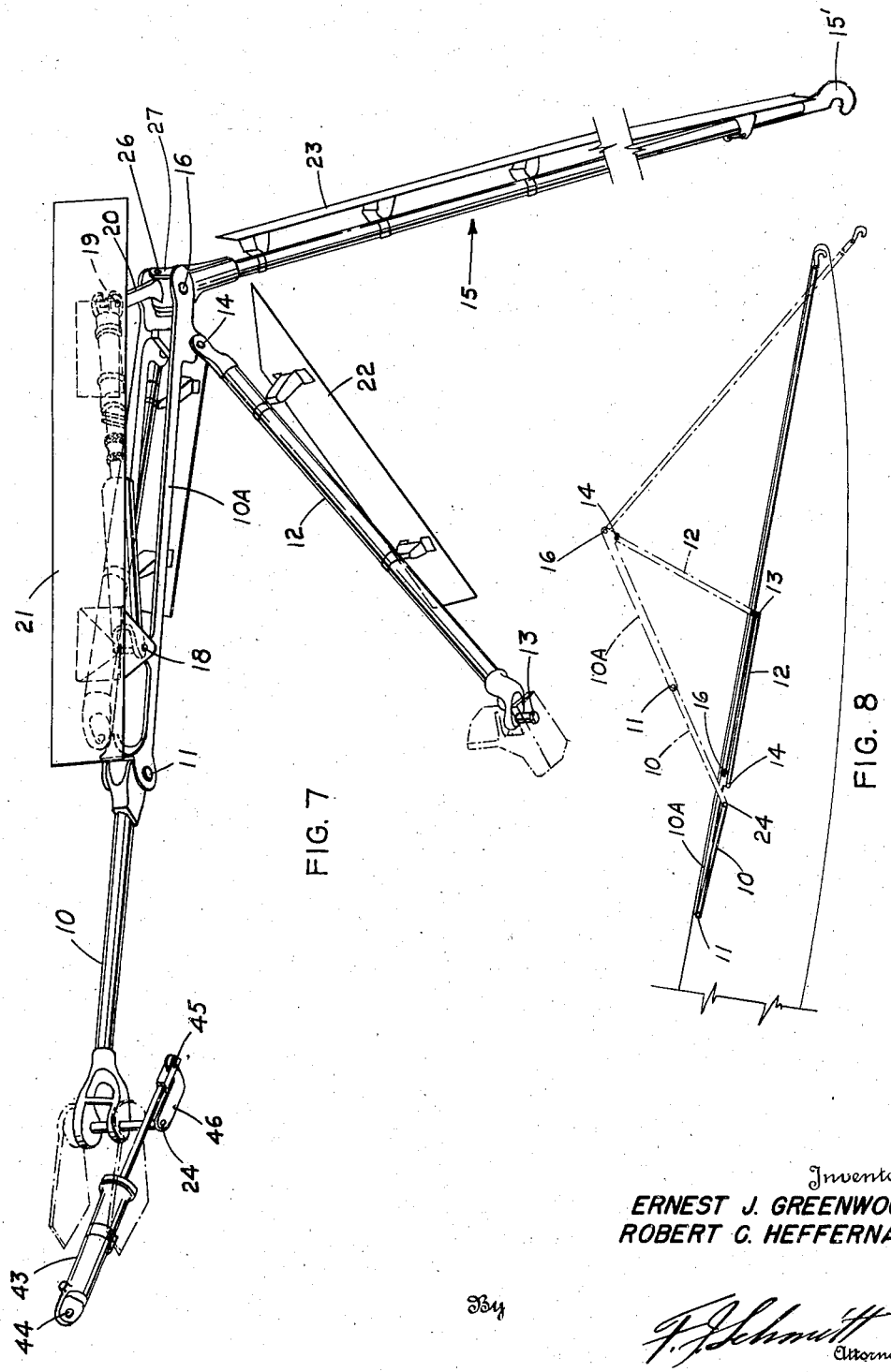

Patented July 26, 1949

2,477,515

UNITED STATES PATENT OFFICE 2,477,515

ARRESTING GEAR

Ernest J. Greenwood, Stratford, Conn., and Robert C. Heffernan, St. Albans, N. Y., assignors, by mesne assignments, to the United States of America as represented by the Secretary of the Navy Application August 13, 1948, Serial No. 44,188

9 Claims. (Cl. 244—110)

This invention relates to arresting gear for aircraft and particularly to a novel arresting gear arrangement for low aspect ratio all-wing aircraft, such as the Zimmerman type as illustrated herein. In this type of aircraft it has been found desirable to keep the line of action of the arresting gear above the center of gravity of the airplane in order to prevent tail rise upon engagement of the arresting hook head with the arresting cables on the carrier deck. Means of accomplishing this comprises the present invention whereby the arresting gear is housed in the upper contour of the all-wing airplane in the proximity of the trailing edge and is made operative by a hydraulically operated series of linkages which impart motion upwardly and aft to the forward extremity of the hook assembly, allowing the hook head to extend aft of the trailing edge and downward to a position for convenient engagement with carrier deck arresting cables.

With the foregoing and other objects in view, this invention comprises combinations, constructions and arrangements of parts hereinafter disclosed, claimed and illustrated on the accompanying drawings wherein, Fig. 1 is a perspective view of an all-wing aircraft to which this invention has been applied.

Fig. 2 is a perspective view of the retractable arresting gear per se of this invention, in retracted position.

Fig. 3 is a schematic view of the arresting gear in extended position.

Fig. 4 is a detailed view, partly in section and partly broken away, of the dashpot assembly.

Fig. 5 is a partly sectional and partly elevational detailed view of the hook assembly.

Fig. 6 is a fragmentary view of the joint details between the hook assembly and the dashpot assembly.

Fig. 7 is a perspective view with the major part of the gear in fully extended position, as in Fig. 3.

Fig. 8 is a schematic view showing the relationship of the gear mechanism to the aircraft wing, and Fig. 9 is an enlarged sectional detailed view of the dashpot valve.

The preferred embodiment of the invention is illustrated on the drawings accompanying this description wherein the arresting gear is shown in full lines in Figs. 3 and 7 in its fully extended position. Referring to the drawings, it can be seen that the mechanism comprises basically rod assembly 10 and 10A broken pivotally at 11, V brace assembly 12 pivoted to airplane structure at 13, and at 14 to rod 10A, and arresting hook assembly 15 pivoted at 16. Dashpot assembly 17 is also provided, being pivoted at 18 to rod 10A and at 19 to the forward extremity of fitting assembly 20. Each of these members is provided with a fairing assembly, 21, 22, and 23, carried therewith in the extended position and providing concealment within the main airfoil body of the airplane as indicated in Figs. 1 and 8 in the retracted position. Rod assembly 10 and 10A, dashpot assembly 17 and arresting hook assembly 15 are on the longitudinal centerline of the airplane; the lower ends of V brace assembly 12 are displaced equal distances on either side of the centerline. The entire assembly is attached to airplane structure at only three places, point 24 on the centerline of the airplane and at points 13.

Fitting 20, shown in detail in Fig. 6, has an aft extending link 25 to which the forward end of the dashpot 17 is pivoted at 19, and provides at its aft end 26 for universality of motion about point 16 within certain fixed limits. The end of hook assembly 15, shown in detail in Fig. 6 is forked at 27 and is pivoted on the aft end 26 of fitting 20. In order to provide for lateral displacement of hook assembly 15 from the longitudinal centerline of the airplane, the extreme aft end of fitting 20 is cam cut to the configuration indicated at 28', adapted to cooperate with roller 28.

With further reference to Figs. 5 and 6, it can be seen that roller 28 is positioned centrally within the forward end of a piston 29 contained in the hook assembly immediately aft of the bifurcated portion 27. Roller 28 rotates about laterally positioned pin 30. Spring 31 positioned immediately adjacent piston 29, is acted upon by piston 29 upon longitudinal displacement thereof. As above indicated the function of the particular assembly shown in Figs. 5 and 6 is to provide for automatic centering of the arresting hook upon disengagement thereof from the arresting cables, when the arresting hook has been laterally displaced upon alighting of the aircraft. Assuming the arresting gear to be fully extended and assuming further the airplane alights so that its longitudinal centerline is at other than right angles to the arresting wires, it can be seen that as the hook head engages the wires, displacing the hook assembly 15 laterally about point 26, roller 28 being fixed thereto will also be laterally displaced, but is obliged to follow the configuration of the cam 28' of the forward portion of fitting 20 thus compressing piston 29 and loading spring 31. Upon disengagement of the arresting hook from the cables, dissipation of the energy in spring 31 will automatically return piston 29 to the position indicated in the drawing, causing roller 28 to again follow the configuration of cam 28' back to its center position, carrying with it entire hook assembly 15 which will be returned to its normal position in the longitudinal centerline of the airplane.

Attachment points 14 and 11 in the linkages and attachment points 13 where the V brace links are pivoted to aircraft structure comprise conventional pivoted attachments which require no particular discussion.

Dashpot assembly 17 has its main cylinder pivoted on rod 10 at 18. Compression or expansion of its main piston indicated generally as 32 imparts motion to fitting 20 about point 16 which acts as a fulcrum for pivotation of the arresting hook assembly 15. The construction of the dashpot 17 is shown in detail in Fig. 4 to which reference is now directed. The dashpot 17 is shown in fully extended position. Working chamber 33 contains a piston head 34 slidable therein, the forward end of which is fixed to the fitting 40' pivoted about point 18. Aft of working chamber 33 is a reservoir chamber 35 which contains a second piston head 36 slidable therein. The external cylinder wall of the reservoir chamber 35 is fitted at its aft end into fitting 37 pivoted about point 19. Working chamber 33 is connected to reservoir chamber 35 by flapper valve 38 which has several orifices which open in a forward direction, but only one very small orifice 39' opening from chamber 33 into chamber 35 in the rearward direction. A large aperture 39 is provided in the forward wall of reservoir chamber 35. Within guiding casing 40 mounted on fitting 40' is provided a heavily loaded spring 41, and piston head 36 in the reservoir chamber is acted on by a very lightly loaded spring 42. Both the working chamber 33 and the reservoir chamber 35 in the position indicated on the drawing are filled with hydraulic fluid prior to the installation of the dashpot. The heavy spring 41 performs two functions:

(1) Being loaded with a potential force of about 300 pounds it provides the arresting hook head with a snubbing force of about 10 pounds in its extended position so that the hook will tend always to grab at the arresting cables. This snubbing force is obtained by reason of a short moment arm from point 19 to point 16 and a long arm from point 16 about which the whole system rotates to the aft extremity of the arresting hook head 15'.

(2) It tends always to return the dashpot to its extended position thus lowering the hook head after a full run-up on the deck. The operation of the dashpot system is as follows: Assuming the arresting gear in its extended position ready for a deck landing, the dashpot is always fully extended. As the airplane alights the arresting hook head 15' in engaging the arresting cables will tend to stay with the arresting cables by reason of the snubbing force provided by the heavily loaded spring 41. During deck run-up, the arresting cable, which the hook head 15' has grasped, will be stretched to its fullest extension and the hook head will rise to its full-up position. The rotational energy acquired by the hook in its upward movement is dissipated by compressing piston 34 in the dashpot, against the heavy load of spring 41, into the working chamber 33, forcing the oil in that chamber through the very small orifice 39' in flapper valve 38 slowly into reservoir chamber 35 compressing piston 36 against lightly loaded spring 42 until all the oil which was in the working chamber 33 is in the reservoir chamber 35 and spring 42 is fully compressed. As soon as the airplane comes to a full stop, the arresting cable having been fully extended, the heavily loaded spring 41 having no opposing force will immediately extend the entire dashpot system to the position shown in Fig. 4. As this happens the flapper valve 38 will open its several orifices and allow the oil from the reservoir chamber to return at a rapid rate through aperture 39 to working chamber 33. The extension of the dashpot piston imparts rotational motion about point 16 to link 25 of fitting 20 thus dropping the hook head 15' to its lowermost position and disengaging it from the arresting cable.

The actuating cylinder or strut which extends the entire arresting gear system to the operative position shown in full lines in Figs. 3 and 7 or retracts it to a position of concealment beneath the top contour of the airplane, is indicated at 43. This actuating cylinder or strut is of conventional design being pivoted at its forward end to airplane structure at 44 and having its piston pivoted at 45 to a link 46 which moves only about point 24 in the arc indicated at 47 from retracted position to the full line position indicated. Link 46 when rotated by actuating strut 43 carries rod 10 with it about point 24 and hence the entire linkage system from its retracted to the extended position as shown in full lines. The retracted position of the system is indicated in Fig. 3 in phantom lines. Conventional cockpit control not shown, operates the actuating cylinder 43.

Thus it can be seen that this invention provides a novel arresting gear arrangement for low aspect ratio all-wing aircraft which adequately prevents tail rise upon alighting, which provides for lateral displacement of the arresting hook, and which is concealed within the upper contour of the airfoil body during normal flight.

What is claimed is:

1. An extendable and retractable arresting hook for all-wing aircraft comprising an extendable hook member arranged to lie in a horizontal, longitudinal direction in the upper rear end of the aircraft, a V strut having its legs pivoted to the aircraft structure at points on opposite sides of the hook member position, an operating folding strut having one leg horizontally pivoted to the aircraft structure at a point in a line extending longitudinally forward of the hook member and having its other leg horizontally pivoted to the apex of said V strut, a fitting also horizontally pivoted to said folding strut other leg at a point somewhat displaced from said apex pivot, a bifurcated end on said hook member vertically pivoted to said fitting, said fitting including an arm providing a rigid extension to the normal longitudinal position of said hook member, and a normally extended dashpot assembly pivoted to said fitting arm and to a mid point on said folding strut other arm.

2. An extendable and retractable arresting hook for all-wing aircraft comprising an extendable hook member arranged to lie in a horizontal, longitudinal direction in the upper rear end of the aircraft, a V strut having its legs pivoted to the aircraft structure at points on opposite sides of the hook member position, an operating folding strut having one leg horizontally pivoted to the aircraft structure at a point in a line extending longitudinally forward of the hook member and having its other leg horizontally pivoted to the apex of said V strut, a fitting also horizontally pivoted to said folding strut other leg at a point somewhat displaced from said apex pivot, a bifurcated end on said hook member vertically pivoted to said fitting, a cooperating cam on said fitting and yieldably displaceable roller means on said bifurcated end permitting said hook member to pivot about said vertical pivot but normally returning said hook member to its normal longitudinally extending position, said fitting including an arm providing a rigid extension to the normal longitudinal position of said hook member, and a normally extended dashpot assembly pivoted to said fitting arm and to a mid point on said folding strut other arm.

3. An extendable and retractable arresting hook for all-wing aircraft comprising an extendable hook member arranged to lie in a horizontal, longitudinal direction in the upper rear end of the aircraft, a V strut having its legs pivoted to the aircraft structure at points on opposite sides of the hook member position, an operating folding strut having one leg horizontally pivoted to the aircraft structure at a point in a line extending longitudinally forward of the hook member and having its other leg horizontally pivoted to the apex of said V strut, a fitting also horizontally pivoted to said folding strut other leg at a point somewhat above said apex pivot, a bifurcated end on said hook member vertically pivoted to said fitting, a cooperating cam and yieldably displaceable roller means on said bifurcated end and said fitting permitting said hook member to pivot about said vertical pivot but normally returning said hook member to its normal longitudinally extending position, said fitting including an arm providing a rigid extension to the normal longitudinal position of said hook member, and a normally extended dashpot assembly pivoted to said fitting arm and to a mid-point on said folding strut other arm, and controllable means for working said operating folding strut to advance or retract said hook member.

4. In an arresting gear for all-wing aircraft arranged to be located in the rear upper contour of the aircraft, said gear comprising an extendable hook, a V strut assembly arranged to have its legs pivoted to the aircraft through its upper contour, a fitting horizontally pivoted to the apex of said V strut assembly, said hook being vertically pivoted to said fitting, cam and roller means on said hook and said fitting yieldably urging said hook to a position in the vertical plane bisecting the V of the V strut assembly, and means pivoted to said V strut assembly and cooperating with said fitting for pivoting said V assembly about its leg pivots to extend said hook, said means including a two-legged folding strut, one leg of said folding strut being pivoted to said V strut assembly at its apex parallel to but below the pivot between said extendable hook and said fitting, the other leg of said strut being pivoted about a fixed point of the air craft structure, and means for controllably pivoting said other leg about such fixed point.

5. In an arresting gear for all-wing aircraft arranged to be located in the rear upper contour of the aircraft, said gear comprising an extendable hook, a V strut assembly arranged to have its legs pivoted to the aircraft through its upper contour, a fitting horizontally pivoted to the apex of said V strut assembly, said hook being vertically pivoted to said fitting, and means pivoted to said V strut assembly and cooperating with said fitting for pivoting said V assembly about its leg pivots to extend said hook, said means including a two-legged folding strut, one leg of said folding strut being pivoted to said V strut assembly at its apex parallel to but below the pivot between said extendable hook and said fitting, the other leg of said strut being pivoted about a fixed point of the aircraft structure, and means for controllably pivoting said other leg about such fixed point to thereby advance or retract said hook member.

6. An arresting gear for all-wing aircraft arranged to be located in the rear upper contour of the aircraft, said gear comprising an extendable hook, a V strut assembly arranged to have its legs pivoted to the aircraft through its upper contour, a fitting horizontally pivoted to the apex of said V strut assembly, said hook being vertically pivoted to said fitting, cam and roller means on said hook and said fitting yieldably urging said hook to a position in the vertical plane bisecting the V of the V strut assembly, and means pivoted to said V strut assembly and cooperating with said fitting for pivoting said V assembly about its leg pivots to extend said hook, said means including a two-legged folding strut, one leg of said folding strut being pivoted to said V strut assembly at its apex parallel to but below the pivot between said extendable hook and said fitting, the other leg of said strut being pivoted about a fixed point of the aircraft structure, a normally extended dashpot assembly pivoted to an extension on said fitting and a mid-point of said one leg of said folding strut and means for controllably pivoting said other leg about such fixed point.

7. An arresting gear for aircraft arranged to extend and retract through the upper rear contour of the aircraft comprising a longitudinally extendable hook member, an operating folding strut, a V strut, and a normally extending dashpot assembly, said folding strut being pivotedly secured at one end to the aircraft structure at a point longitudinally forward of the hook member, said V strut including legs pivoted to the aircraft structure at points laterally displaced from said hook member position, the other end of said folding strut legs being pivoted at its end to the hook member and at a point displaced from but adjacent said latter end, to the apex of said V strut, an extension fitting on said hook member, said dashpot assembly being pivoted to said extension fitting and to a point on said folding strut leg adjacent its folding pivot.

8. An arresting gear for aircraft arranged to extend and retract through the upper rear contour of the aircraft comprising a longitudinally extendable hook member, an operating folding strut, a V strut, and a normally extending dashpot assembly, said folding strut being pivotedly secured at one end to the aircraft structure at a point longitudinally forward of the hook member, said V strut including legs pivoted to the aircraft structure at points laterally displaced from said hook member position, the other end of said folding strut being pivoted at its end to the hook member and at a point displaced from but adjacent said latter end to the apex of said V strut, an extension fitting on said hook member, said dashpot assembly being pivoted to said extension fitting and to a point on said folding strut adjacent its folding pivot and yieldable means permitting said hook member to pivot laterally about its extension fitting but normally returning said hook member to its longitudinal position.

9. An arresting gear for aircraft arranged to extend and retract through the upper rear contour of the aircraft comprising a longitudinally extendable hook member, an operating folding strut, a V strut, and a normally extending dashpot assembly, said folding strut including a pair of legs one of which is pivotedly secured to the aircraft structure at a point longitudinally forward of the hook member, said V strut including legs pivoted to the aircraft structure at points laterally displaced from said hook member position, the other of said folding strut legs being pivoted at its end to the hook member and, at a point displaced from but adjacent said latter end, to the apex of said V strut, an extension fitting on said hook member, said dashpot assembly being pivoted to said extension fitting and to a point on said other folding strut leg adjacent its folding pivot, and yieldable means permitting said hook member to pivot laterally about its extension fitting but normally returning said hook member to its longitudinal position.

ERNEST J. GREENWOOD.
ROBERT C. HEFFERNAN.

No references cited.